E. D. Castelow,
Attaching Legs to Piano-Stools,
N°53,571. Patented Apr. 3, 1866.
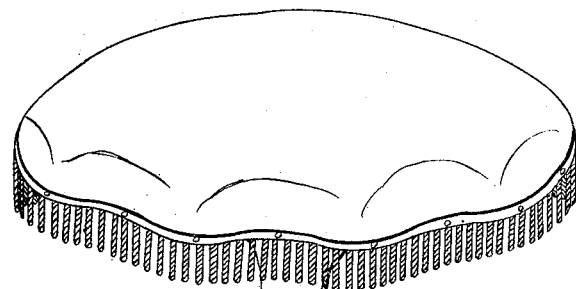
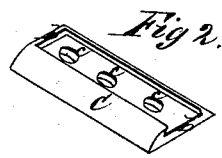
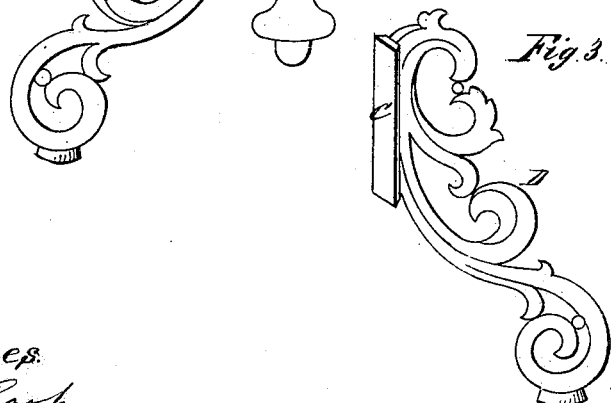
Witnesses
A. J. Cook
R. Fitzgerald
Inventor:
E D Castelow

UNITED STATES PATENT OFFICE.

ELIJAH D. CASTELOW, OF MERIDEN, CONNECTICUT.

IMPROVED MEANS FOR ATTACHING LEGS TO MUSIC-STOOLS.

Specification forming part of Letters Patent No. 53,571, dated April 3, 1866.

*To all whom it may concern:*

Be it known that I, ELIJAH D. CASTELOW, of West Meriden, in the county of New Haven and State of Connecticut, have invented a new and useful Improvement in Attaching Legs to Music-Stools, &c.; and I do hereby declare that the following is a full, clear, and exact description of the construction, character, and operation of the same, reference being had to the accompanying drawings, which make part of this specification, in which—

Figure 1 is a perspective view of a stool with one of its legs removed, showing how the female part of the connection is attached to or connected with the pillar of the stool. Fig. 2 is a perspective view of one of the pieces or blocks which contain the female dovetail of the connection. Fig. 3 is a perspective view of one of the legs, detached, showing the male dovetail, which fits into the female dovetail or space, to be attached to the lower or cylindrical part of the pillar. Fig. 4 is a perspective view of the flat ring or disk which is to hold the legs securely in their places.

My improvement consists in fitting to the lower end or portion of the pillar three or more pieces, with vertical dovetail spaces in their outer or external surfaces suitable to receive a male dovetail, which I make upon the upper portion of each of the legs, and a flat ring or disk to hold the legs secure in their places while handling or moving the stool, &c.

I make the pillar or central standard or support of wood or any other suitable material, as shown at A and B, Fig. 1, or of any other suitable pattern to suit the taste or the market, making the lower portion, as at B, essentially cylindrical or polygonal in its cross-section, and in this part B, in three or more places, at equal distances from each other, I cut or make vertical spaces to receive the metallic blocks or pieces, which I secure by screws, as shown at *a a a*, Fig. 1, to receive the legs.

I make the blocks or pieces C, Figs. 2 and 1, of cast-iron or any other suitable material, substantially of the shape shown in Fig. 2, with a dovetail space extending from the lower end nearly to the upper end, as shown at *b b*, Figs. 2 and 1, and I make or cast holes, as *c c c*, in it to receive the screws by which I attach it to the cylindrical part B of the pillar, as shown at *a a a*, Fig. 1.

I make the legs D of cast-iron or any other suitable material, in the form shown in Fig. 3, or any other shape which fancy or the market may call for, with a male dovetail, as shown at E, Fig. 4, suited to pass into the dovetail space *b b* in Fig. 2, shown also at *a a a*, Fig. 1.

I make the flat ring or disk, Fig. 4, of cast-iron or any other suitable material, of a suitable size or diameter, to extend under the dovetail spaces, as shown at *d*, Fig. 1, and I make holes in it, as shown at *e e e*, Fig. 4, suitable to receive the screws by which I attach it to the lower end of the pillar, as represented at *d*, Fig. 1.

Having made the several parts as before described, I attach the blocks or pieces, Fig. 2, to the part B, Fig. 1, by means of screws, as represented at C, *a a a*, Fig. 1, and indicated at C and C, Fig. 1. I then slip the dovetail E, Fig. 3, on the leg into the dovetail space shown in Figs. 2 and 1, and put on the flat ring or disk, Fig. 4, as shown at *d*, Fig. 1, and secure it by means of screws passing through the holes *e e e*, Fig. 4, when the pillar will be ready to receive the top, as G, Fig. 1, or in any other shape.

When I desire to pack these stools, &c., for transportation, &c., I take off the disk, Fig. 4, and slip out the legs, when they may be packed in a very small part of the space which they would otherwise occupy, and avoid all danger of breaking the legs by packing or transporting. And if a leg should ever get broken by accident, another may be supplied with the utmost readiness (requiring no other tool than a screw-driver) by taking off the disk, Fig. 4, removing the piece and slipping in a new leg.

This attachment is equally applicable to center-tables and all other articles which rest on a central pillar; and any other number of legs may be attached in the same way, if desired, at any time.

What I claim as my invention, and desire to secure by Letters Patent, is—

The combination of the pillar A B with the blocks or pieces C, the legs D, and disk *d*, when the dovetails are made to fit, and the disk to hold, substantially as herein described.

E. D. CASTELOW.

Witnesses:
A. J. COOK,
R. FITZGERALD.